US012774738B1

(12) United States Patent
Stollmaier et al.

(10) Patent No.: US 12,774,738 B1

(45) Date of Patent: Oct. 27, 2026

(54) SPROCKET DAMPING ASSEMBLY FOR CONVEYOR SYSTEM

(71) Applicant: TREW, LLC, West Chester, OH (US)

(72) Inventors: Brian T. Stollmaier, Milford, OH (US); Jeffrey L. Vessell, Morrow, OH (US)

(73) Assignee: TREW, LLC, West Chester, OH (US)

( * ) Notice: Subject to any disclaimer, the term of this patent is extended or adjusted under 35 U.S.C. 154(b) by 0 days.

(21) Appl. No.: 19/263,806

(22) Filed: Jul. 9, 2025

(51) Int. Cl.
*F16H 55/30* (2006.01)

(52) U.S. Cl.
CPC ....... *F16H 55/30* (2013.01); *F16H 2055/306* (2013.01)

(58) Field of Classification Search
CPC ........................... F16H 55/30; F16H 2055/306
See application file for complete search history.

(56) References Cited

U.S. PATENT DOCUMENTS 975,938 A * 11/1910 Downey ................. F16H 55/30 474/161
2,492,219 A * 12/1949 Haefeli ..................... F16H 7/06 474/148
2,953,930 A * 9/1960 Meyer ....................... F16H 7/06 474/148
4,022,072 A * 5/1977 Chagawa ........... B62D 55/0963 474/901
4,227,422 A * 10/1980 Kawashima .............. F16H 7/06 198/834
4,261,214 A * 4/1981 Watanabe ................ B62M 9/00 474/151
4,332,574 A * 6/1982 Aoyama ................. F16H 55/30 474/161
4,348,199 A * 9/1982 Oonuma ........... F16H 57/02004 474/151
4,867,733 A * 9/1989 Yamanoi ................... F16H 7/06 474/161
5,013,286 A * 5/1991 Breher ....................... F16G 1/28 474/205
5,224,903 A * 7/1993 Langhof .................. B62M 9/08 474/152
5,819,910 A * 10/1998 Langer .................. B66B 23/024 198/330
5,980,408 A * 11/1999 Schulz .................... F16H 55/30 474/151

(Continued)

FOREIGN PATENT DOCUMENTS

CN 210423642 U 4/2020
JP 2007270878 A 10/2007
JP 4331004 B2 9/2009

*Primary Examiner* — Henry Y Liu

(74) *Attorney, Agent, or Firm* — Dinsmore & Shohl LLP

(57) ABSTRACT

A sprocket damping assembly including a plurality of sprocket damping segments is disclosed. The sprocket damping segment includes a plate and a gasket. The plate includes an inner surface, an outer surface opposite the inner surface, an inner radial edge, an outer radial edge opposite the inner radial edge, a first side edge, and a second side edge opposite the first side edge, a groove formed in the inner surface and extending along the outer radial surface, the first side edge, and the second side edge. The gasket is positionable within the groove to extend along the outer radial edge, the first side edge, and the second side edge of the plate.

20 Claims, 5 Drawing Sheets

(56) References Cited

U.S. PATENT DOCUMENTS

| | | | | |
|---|---|---|---|---|
| 5,984,817 | A * | 11/1999 | Schulz | F16H 55/30 474/160 |
| 6,179,741 | B1 * | 1/2001 | Young | F16H 55/30 474/160 |
| 6,371,874 | B1 * | 4/2002 | Inoue | F16H 55/30 474/161 |
| 6,371,875 | B2 * | 4/2002 | Young | F16H 55/30 474/160 |
| 6,652,402 | B2 * | 11/2003 | Poiret | F16H 7/06 474/210 |
| 6,656,072 | B2 * | 12/2003 | Sugita | F16H 55/30 474/160 |
| 6,910,980 | B2 * | 6/2005 | Hamilton | F16H 55/30 474/94 |
| 7,032,983 | B2 * | 4/2006 | Wu | F16H 55/30 305/195 |
| 7,074,147 | B2 * | 7/2006 | Young | F16H 7/06 474/160 |
| 7,094,170 | B2 * | 8/2006 | Young | F16H 57/0006 474/213 |
| 7,232,392 | B2 * | 6/2007 | Hamilton | F16H 55/06 474/94 |
| 7,371,200 | B2 * | 5/2008 | Young | F16H 7/06 156/160 |
| 7,416,500 | B2 * | 8/2008 | Young | F16H 55/30 474/202 |
| 7,862,460 | B2 * | 1/2011 | Chekansky | F16H 55/30 474/163 |
| 7,914,408 | B2 * | 3/2011 | Young | F16H 55/30 474/152 |
| 8,083,624 | B2 * | 12/2011 | Young | F16H 55/30 474/100 |
| 8,202,185 | B2 * | 6/2012 | Haesloop | F16H 55/30 474/191 |
| 8,764,593 | B2 * | 7/2014 | Grobbel | F16H 55/30 474/94 |
| 9,145,965 | B2 * | 9/2015 | Kwon | F16H 55/30 |
| 9,933,063 | B2 * | 4/2018 | Ognibene | F16H 55/30 |
| 9,957,852 | B2 * | 5/2018 | Barrera | F16H 9/26 |
| 10,359,107 | B2 * | 7/2019 | Young | F16H 55/30 |
| 10,605,348 | B2 * | 3/2020 | Göb | F16H 7/06 |
| 11,268,606 | B2 * | 3/2022 | Meder | F01L 1/022 |
| 11,402,009 | B2 * | 8/2022 | Mori | F16H 55/14 |
| 12,305,741 | B2 * | 5/2025 | Shimizu | F16H 55/14 |
| 2001/0000171 | A1 * | 4/2001 | Young | F16H 55/30 474/161 |
| 2002/0169044 | A1 * | 11/2002 | Young | F16H 55/30 474/160 |
| 2004/0185977 | A1 * | 9/2004 | Young | F16H 55/30 474/205 |
| 2004/0204274 | A1 * | 10/2004 | Young | F16H 55/30 474/100 |
| 2005/0170925 | A1 * | 8/2005 | Hamilton | F16H 55/30 474/152 |
| 2006/0252592 | A1 * | 11/2006 | Young | F16H 7/06 474/152 |
| 2007/0111833 | A1 * | 5/2007 | Young | F16H 55/30 474/100 |
| 2007/0293361 | A1 * | 12/2007 | Young | F16H 7/06 474/152 |
| 2008/0293531 | A1 * | 11/2008 | Chekansky | F16H 55/30 474/163 |
| 2009/0093329 | A1 * | 4/2009 | Markley | F16H 55/30 474/161 |
| 2009/0118047 | A1 * | 5/2009 | Haesloop | F16H 55/30 474/161 |
| 2010/0273589 | A1 * | 10/2010 | Grobbel | F16H 55/30 428/521 |
| 2011/0300977 | A1 * | 12/2011 | Hayami | F16H 55/30 474/161 |
| 2015/0045165 | A1 * | 2/2015 | Kwon | F16H 55/30 474/161 |
| 2015/0176692 | A1 * | 6/2015 | Roh | F16H 7/06 474/156 |
| 2017/0030453 | A1 * | 2/2017 | Young | F16H 55/30 |
| 2017/0067551 | A1 * | 3/2017 | Ognibene | F16H 55/14 |
| 2018/0058566 | A1 * | 3/2018 | Göb | F16H 57/0006 |
| 2018/0180156 | A1 * | 6/2018 | Koller | F16H 55/30 |
| 2018/0328479 | A1 * | 11/2018 | Meder | F16H 55/30 |
| 2024/0011549 | A1 * | 1/2024 | Shimizu | F16H 55/06 |

* cited by examiner

SPROCKET DAMPING ASSEMBLY FOR CONVEYOR SYSTEM

TECHNICAL FIELD

The present specification generally relates to conveyor systems for transporting articles, more specifically, sprocket damping assemblies for minimizing noise during operation of the conveyor systems.

BACKGROUND

Sprockets and sprocket chains are widely used in mechanical systems for power transmission, particularly in bicycles, motorcycles, conveyors, and industrial machinery. During operation, the engagement between teeth of the sprocket and link plates of the sprocket chain generates noise due to impacts, vibrations, and friction. Factors such as chain tension, lubrication, wear, and misalignment further contribute to the overall sound levels. In high-speed or precision applications, excessive noise can lead to operational inefficiencies, increased wear, and user discomfort. As a result, reducing the noise generated by sprocket and chain assemblies is a key concern for manufacturers and users alike.

To address this issue, various noise-dampening techniques have been explored, including modifications to the sprocket tooth profile, the use of dampening materials, and improvements in lubrication methods. However, existing solutions often present trade-offs, such as reduced durability, increased maintenance requirements, or compromised performance.

Accordingly, a need exists for improved systems or methods that effectively reduce the noise generated by sprockets and chains while maintaining or enhancing overall efficiency and longevity.

SUMMARY

In one embodiment, a sprocket damping segment includes: a plate including an inner surface, an outer surface opposite the inner surface, an inner radial edge, an outer radial edge opposite the inner radial edge, a first side edge, and a second side edge opposite the first side edge, a groove formed in the inner surface and extending along the outer radial surface, the first side edge, and the second side edge; and a gasket positionable within the groove to extend along the outer radial edge, the first side edge, and the second side edge of the plate.

In another embodiment, a sprocket damping assembly includes: a plurality of sprocket damping segments arranged in a circular orientation, each sprocket damping segment including: a plate including an inner surface, an outer surface opposite the inner surface, an inner radial edge, an outer radial edge opposite the inner radial edge, a first side edge, and a second side edge opposite the first side edge, a groove formed in the inner surface and extending along the outer radial surface, the first side edge, and the second side edge; and a gasket positionable within the groove to extend along the outer radial edge, the first side edge, and the second side edge of the plate.

In yet another embodiment, a conveyor system includes: a shaft; a pair of sprockets provided at opposite ends of the shaft; and a pair of sprocket damping assemblies, each sprocket damping assembly provided on a respective sprocket, each sprocket assembly comprising a plurality of sprocket damping segments, each sprocket damping segment including: a plate including an outer radial edge, a first side edge, and a second side edge opposite the first side edge, a groove formed in the plate and extending along the outer radial surface, the first side edge, and the second side edge; and a gasket positionable within the groove to extend along the outer radial edge, the first side edge, and the second side edge of the plate.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
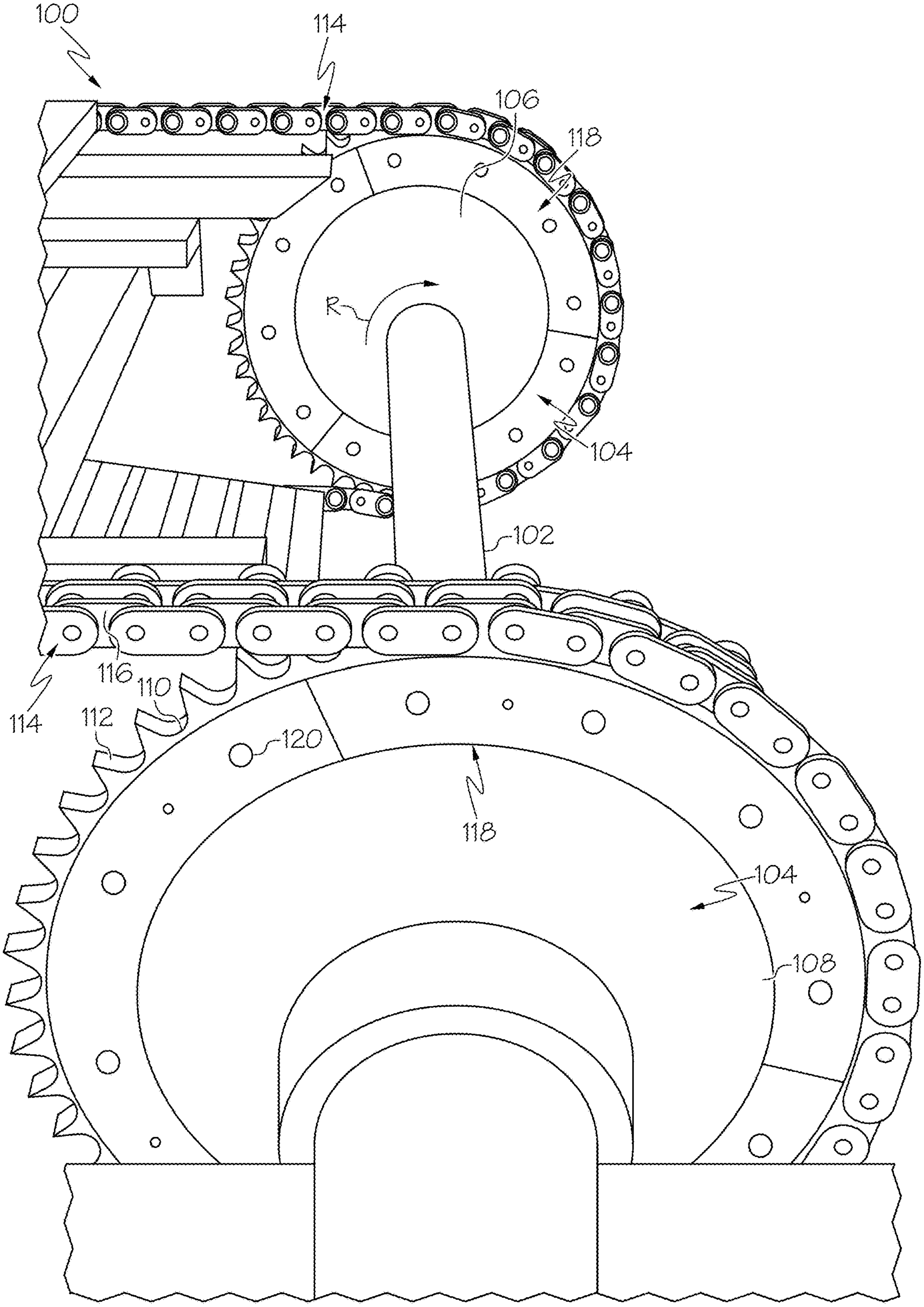
FIG. 1 schematically depicts a partial perspective view of a conveyor system including a sprocket damping assembly, according to one or more embodiments shown and described herein.

Embodiments described herein are directed to a conveyor system including a sprocket damping assembly mounted onto a sprocket to dampen noise caused by contact of a chain on the sprocket. The sprocket damping assembly includes a plurality of sprocket damping segments including a plate and a gasket positioned within a groove formed in the plate. The groove extends along an outer radial edge, a first side edge, and a second side edge of the plate. Various embodiments of the sprocket damping assembly and the operation of the sprocket damping assembly are described in more detail herein. Whenever possible, the same reference numerals will be used throughout the drawings to refer to the same or like parts.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, a conveyor system 100 is illustrated according to one or more embodiments described herein. The conveyor system 100 may be any suitable system such as, for example, a belt conveyor system in which articles provided on a surface of a belt are transported, a sliding shoe sorter conveyor including a plurality of slats attached to a chain that transport articles provided on the slats along a conveying surface, or the like.

As shown in FIG. 1, a conveying surface, such as a belt or a plurality of slats, of the conveyor system is removed to more clearly illustrate internal components of the conveyor system 100. Specifically, the conveyor system 100 includes a shaft 102 and a pair of sprockets 104 provided at opposite ends of the shaft 102. A motor may be provided or communicatively coupled to one of the sprockets 104 or the shaft 102 directly to rotate the shaft 102, and thus both sprockets 104 in a conveyance direction, as indicated by arrow R. Each sprocket 104 includes an inner surface 106 facing an interior of the conveyor system, an outer surface 108 opposite the inner surface 106, a perimeter 110 extending between the inner surface 106 and the outer surface 108, and a plurality of teeth 112 formed at the perimeter 110 extending in an outer radial direction.

The conveyor system 100 includes a pair of chains 114 with each chain 114 including a plurality of link plates 116 joined to one another. Each chain 114 is looped around a respective one of the sprockets 104 such that the link plates 116 and rollers 128 (FIG. 2) of the chains 114 engage the teeth 112 of the respective sprocket 104. Although not shown, an opposite end of the chain 114 may be looped around an upstream or downstream sprocket 104 in a similar manner. Rotation of the sprockets 104 in the direction of arrow R pulls the chains 114 in the conveyance direction, thus rotating a conveying surface mechanically coupled to the chains 114 in the same direction. During operation of the conveyor system 100, rollers 128 (FIG. 2) of the chains 114 contacting crests 130 (FIG. 2) of the sprockets 104 may result in undesirable noise and/or wear on the sprockets 104. Thus, it is desirable to prevent such contact between the chains 114 and the sprockets 104.

Referring still to FIG. 1, one or more sprocket damping assemblies 118 may be provided on each sprocket 104. In embodiments, a sprocket damping assembly 118 may be provided on the inner surface 106 of each sprocket 104. In other embodiments, a sprocket damping assembly 118 may be provided on the outer surface 108 of each sprocket 104. In other embodiments, a first sprocket damping assembly 118 is provided on the inner surface 106 of each sprocket 104 and a second sprocket damping assembly 118 is provided on the outer surface 108 of each sprocket 104.

The sprocket damping assembly 118 may be attached to the inner surface 106 or the outer surface 108 of the sprockets 104 in any suitable manner such as by welding, fastening, clamps, or the like. As shown in FIG. 1, a plurality of fasteners 120 extend through each sprocket damping assembly 118 to secure the sprocket damping assemblies 118 to the sprockets 104. Each sprocket damping assembly 118 may include one or more sprocket damping segments 122 extending around a portion of the inner surface 106 or the outer surface 108 of the sprocket 104. For example, the sprocket damping assemblies 118 depicted in FIG. 1 each include three sprocket damping segments 122. However, it should be appreciated that the sprocket damping assembly 118 may include any number of sprocket damping segments 122 such as two or more than three sprocket damping segments 122.

As shown in FIG. 1, the sprocket damping segments 122 have an arcuate shape and are arranged to form a complete circle around the inner surface 106 or the outer surface 108 of the sprockets 104. In embodiments, each of the sprocket damping segments 122 are individually fixed to the sprocket 104 in the manner discussed herein. In embodiments, the sprocket damping segments 122 may be joined to adjacent sprocket damping segments 122 and less than every sprocket damping segment 122 may be fixed to the sprocket 104. In other embodiments, the sprocket damping segments 122 are not fixed to one another. In such embodiments, the sprocket damping segments 122 are positioned with ends positioned adjacent one another and each sprocket damping segment 122 individually fixed to the sprocket 104.

Figure 2:
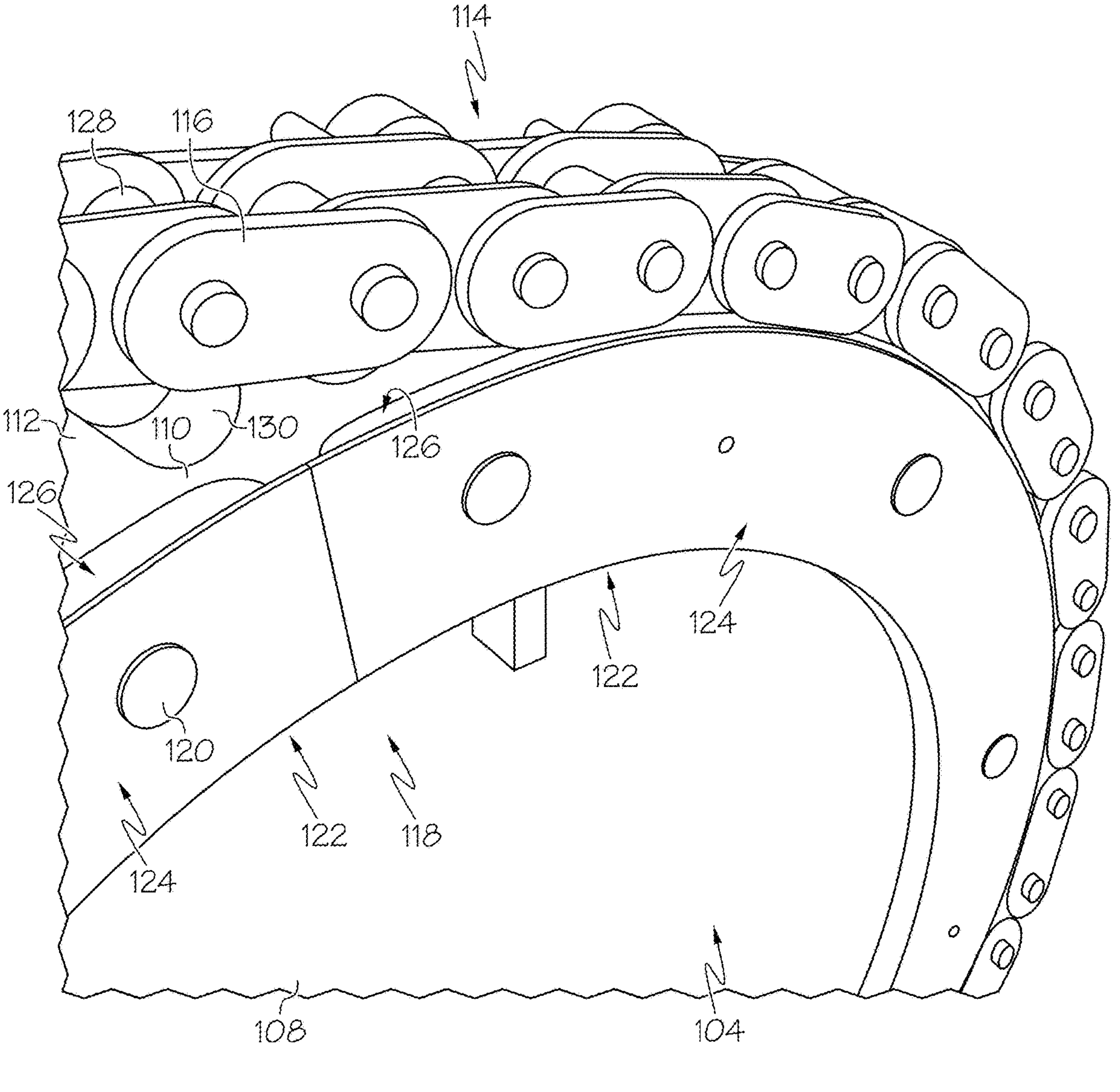
FIG. 2 schematically depicts an enlarged partial perspective view of conveyor the sprocket damping assembly, according to one or more embodiments shown and described herein.

Referring now to FIG. 2, a close up of the sprocket damping assembly 118 mounted to the outer surface 108 of the sprocket 104 by a plurality of fasteners 120 is illustrated. As described in more detail herein, each sprocket damping segment 122 of the sprocket damping assembly 118 includes a plate 124 and a gasket 126.

As the sprocket 104 rotates, the link plates 116 of the chain 114 come into contact with the perimeter 110 of the sprocket 104. Specifically, rollers 128 interconnecting adjacent link plates 116 is received within a crest 130 at the perimeter 110 of the sprocket 104 defined by adjacent teeth 112. As such, when the rollers 128 are received within respective crests 130, a lower surface of the link plates 116 themselves may be disposed radially inwardly of the perimeter 110 of the sprocket 104. The sprocket damping segments 122 are specifically mounted to the sprocket 104 such that an upper surface of the gaskets 126 is located radially inwardly of the perimeter 110 of the sprocket 104. Accordingly, the link plates 116 of the chain 114 also come into contact with the gasket 126 of the sprocket damping segments 122. This reduces contact and/or dampens noise caused by contact between the rollers 128 of the chain 114 and the crests 130 of the sprocket 104. Specifically, the gasket 126 limits a compression force by the link plates 116 against the sprocket 104. As the sprocket 104 continues to rotate, different link plates 116 of the chain 114 contact the gasket 126 of a different sprocket damping segment 122.

Figure 3:
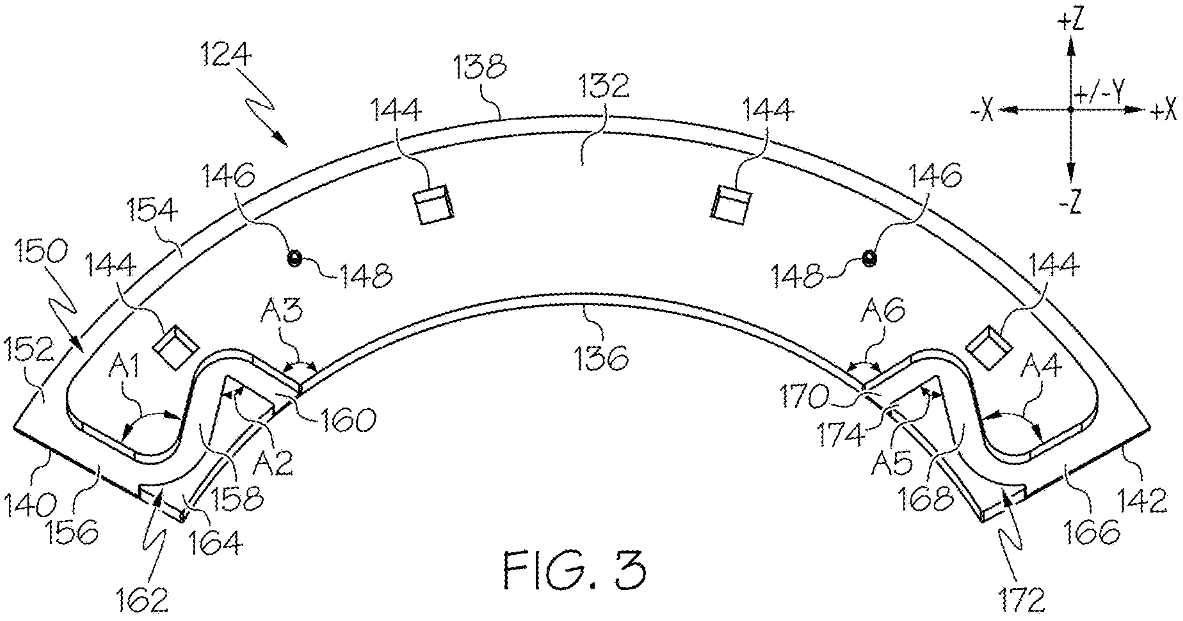
FIG. 3 schematically depicts a front perspective view of a plate of the sprocket damping assembly, according to one or more embodiments shown and described herein.

Referring now to FIG. 3, the plate 124 of one of the sprocket damping segments 122 is depicted with the gasket 126 removed to better illustrate the structure of the plate 124. It should be appreciated that the plate 124 of each sprocket damping segment 122 is identical to one another. However, in embodiments, the plate 124 of one of the sprocket damping segments 122 may have a different length than the plate 124 of a different sprocket damping segment 122.

Figure 4:
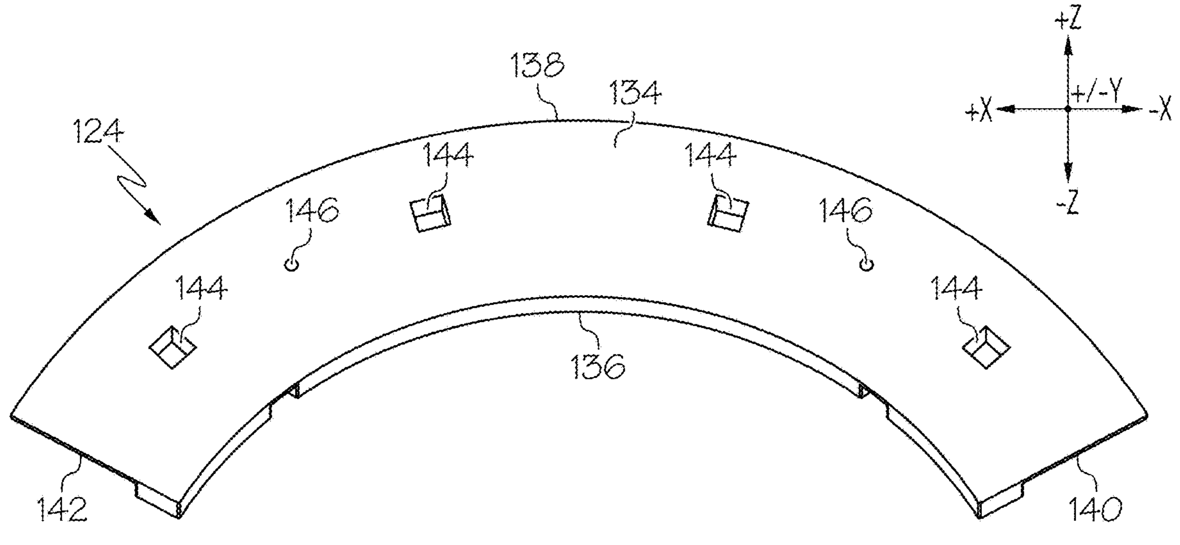
FIG. 4 schematically depicts a rear perspective view of the plate of the sprocket damping assembly, according to one or more embodiments shown and described herein.

As shown in FIGS. 3 and 4, the plate 124 includes an inner surface 132, an outer surface 134 opposite the inner surface 132, an inner radial edge 136, an outer radial edge 138 opposite the inner radial edge 136, a first side edge 140, and a second side edge 142 opposite the first side edge 140. The first side edge 140 and the second side edge 142 extend between the inner radial edge 136 and the outer radial edge 138. In embodiments, one or more mounting apertures 144 are formed in the plate 124 extending through the inner surface 132 and the outer surface 134. As shown, four mounting apertures 144 are formed in the plate 124. The mounting apertures 144 are equidistantly spaced apart from another between the first side edge 140 and the second side edge 142 of the plate 124. However, it should be appreciated that any number of mounting apertures 144 may be formed in the plate 124 including one, two, three, or more than four mounting apertures 144. Additionally, the mounting apertures 144 may be formed in any suitable location on the plate 124. As shown, the mounting apertures 144 have a square cross-sectional shape. However, the mounting apertures 144 may have any suitable shape such as circular or the like. The fasteners 120 (FIG. 1) securing the plate 124 to the sprocket 104 (FIG. 1) extend through the mounting apertures 144 to secure the plate 124 to the sprocket 104.

In embodiments, one or more locating holes 146 are formed in the plate 124 extending through the inner surface 132 and the outer surface 134. As shown, two locating holes 146 are formed in the plate 124. The locating holes 146 are formed between adjacent pairs of mounting holes 144. However, it should be appreciated that any number of locating holes 146 may be formed in the plate 124 including one or more than two locating holes 146. Additionally, the locating holes 146 may be formed in any suitable location on the plate 124. As shown, the locating holes 146 have a circular cross-sectional shape. However, the locating holes 146 may have any suitable shape such as square or the like. The locating holes 146 are utilized for properly positioning the plate 124 onto the sprocket 104 (FIG. 1). For example, a locating pin 148 may be inserted through each of the locating holes 146 to engage a respective receiving hole formed in the sprocket 104 to confirm proper positioning of the plate 124 relative to the sprocket 104. Alternatively, a visual indicator provided on the inner surface 106 or the outer surface 108 of the sprocket 104 may be viewed through the locating holes 146 to confirm a position of the plate 124.

As shown in FIG. 3, a groove 150 is formed in the inner surface 132 of the plate 124 defining a recessed wall 152 spaced apart from the inner surface 132 of the plate 124. The groove 150 defines an outer groove portion 154 extending from the first side edge 140 of the plate 124 to the second side edge 142 of the plate 124 along the outer radial edge 138. The groove 150 further defines a first side groove portion 156 extending from the outer groove portion 154 along the first side edge 140 of the plate 124 and terminating prior to the inner radial edge 136 of the plate 124.

The groove 150 further defines a first inner groove portion 158 extending at a first angle A1 from an end of the first side groove portion 156 opposite the outer groove portion 154. In embodiments, the first angle A1 is greater than 0 degrees and less than 180 degrees. In embodiments, the first angle A1 is equal to or greater than 50 degrees and less than or equal to 110 degrees. In embodiments, the first angle A1 is equal to or greater than 70 degrees and less than or equal to 90 degrees. In embodiments, the first angle A1 is equal to or greater than 75 degrees and less than or equal to 85 degrees.

The groove 150 further defines a first terminating groove portion 160 extending at a second angle A2 from an end of the first inner groove portion 158 opposite the first side groove portion 156. In embodiments, the second angle A2 is greater than 0 degrees and less than 180 degrees. In embodiments, the second angle A2 is equal to or greater than 40 degrees and less than or equal to 100 degrees. In embodiments, the second angle A2 is equal to or greater than 60 degrees and less than or equal to 80 degrees. In embodiments, the second angle A2 is equal to or greater than 65 degrees and less than or equal to 75 degrees.

Additionally, the first terminating groove portion 160 intersects the inner radial edge 136 of the plate 124 at a third angle A3. In embodiments, the third angle A3 is greater than 0 degrees and less than 180 degrees. In embodiments, the third angle A3 is equal to or greater than 60 degrees and less than or equal to 120 degrees. In embodiments, the third angle A3 is equal to or greater than 80 degrees and less than or equal to 100 degrees. In embodiments, the third angle A3 is equal to or greater than 85 degrees and less than or equal to 95 degrees.

The first side groove portion 156, the first inner groove portion 158, and the first terminating groove portion 160 cooperate to define a first entrapment profile 162 in which the gasket 126 is retained, as described in more detail herein. Accordingly, a first corner protrusion 164 extending partially along the first side edge 140 of the plate 124 and the inner radial edge 136 of the plate 124 is defined in the inner surface 132 of the plate 124 by the first side groove portion 156, the first inner groove portion 158, and the first terminating groove portion 160 of the first entrapment profile 162.

Similarly, the groove 150 further defines a second side groove portion 166 extending from the outer groove portion 154 opposite the first side groove portion 156 along the second side edge 142 of the plate 124 and terminating prior to the inner radial edge 136 of the plate 124.

The groove 150 further defines a second inner groove portion 168 extending at a fourth angle A4 from an end of the second side groove portion 166 opposite the outer groove portion 154. In embodiments, the fourth angle A4 is greater than 0 degrees and less than 180 degrees. In embodiments, the fourth angle A4 is equal to or greater than 50 degrees and less than or equal to 110 degrees. In embodiments, the fourth angle A4 is equal to or greater than 70 degrees and less than or equal to 90 degrees. In embodiments, the fourth angle A4 is equal to or greater than 75 degrees and less than or equal to 85 degrees. In embodiments, the fourth angle A4 is equal to the first angle A1.

The groove 150 further defines a second terminating groove portion 170 extending at a fifth angle A5 from an end of the second inner groove portion 168 opposite the second side groove portion 166. In embodiments, the fifth angle A5 is greater than 0 degrees and less than 180 degrees. In embodiments, the fifth angle A5 is equal to or greater than 40 degrees and less than or equal to 100 degrees. In embodiments, the fifth angle A5 is equal to or greater than 60 degrees and less than or equal to 80 degrees. In embodiments, the fifth angle A5 is equal to or greater than 65 degrees and less than or equal to 75 degrees. In embodiments, the fifth angle A5 is equal to the second angle A2.

Additionally, the second terminating groove portion 170 intersects the inner radial edge 136 of the plate 124 at a sixth angle A6. In embodiments, the sixth angle A6 is greater than 0 degrees and less than 180 degrees. In embodiments, the sixth angle A6 is equal to or greater than 60 degrees and less than or equal to 120 degrees. In embodiments, the sixth angle A6 is equal to or greater than 80 degrees and less than or equal to 100 degrees. In embodiments, the sixth angle A6 is equal to or greater than 85 degrees and less than or equal to 95 degrees. In embodiments, the sixth angle A6 is equal to the third angle A3.

The second side groove portion 166, the second inner groove portion 168, and the second terminating groove portion 170 cooperate to define a second entrapment profile 172 in which the gasket 126 is retained, as described in more detail herein. Accordingly, a second corner protrusion 174 extending partially along the second side edge 142 of the plate 124 and the inner radial edge 136 of the plate 124 is defined in the inner surface 132 of the plate 124 by the second side groove portion 166, the second inner groove portion 168, and the second terminating groove portion 170 of the second entrapment profile 172. In embodiments, the second entrapment profile 172 is a mirror image of the first entrapment profile 162.

In embodiments, as shown in FIG. 3, the groove 150 has a consistent depth throughout. Specifically, a distance between the recessed wall 152 and the inner surface 132 of the plate 124 remains the same throughout the outer groove portion 154, the first side groove portion 156, the first inner groove portion 158, the first terminating groove portion 160, the second side groove portion 166, the second inner groove portion 168, and the second terminating groove portion 170.

Figure 5:
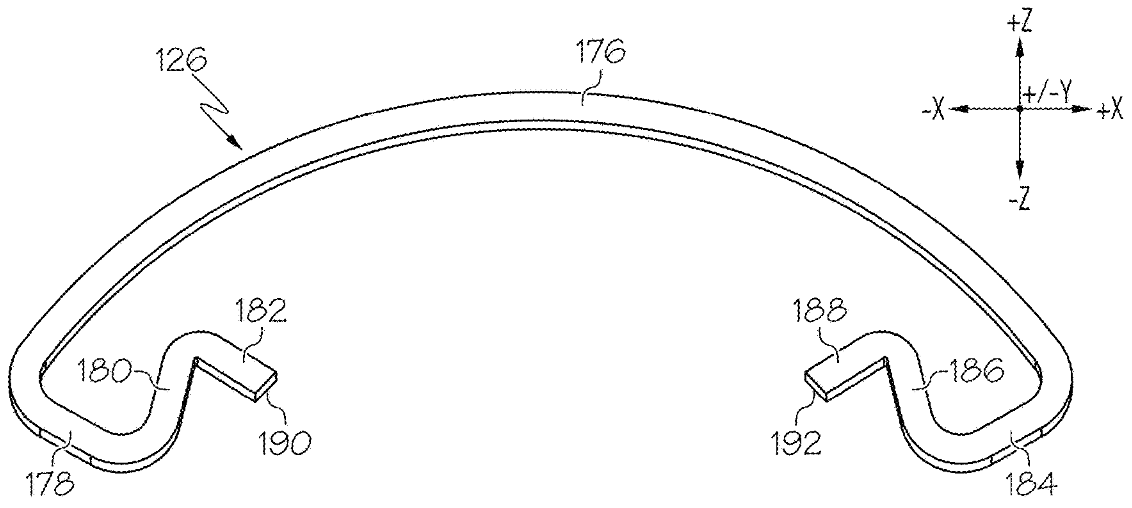
FIG. 5 schematically depicts a front perspective view of a gasket of the sprocket damping assembly, according to one or more embodiments shown and described herein.

Referring now to FIG. 5, the gasket 126 is shown separate from the plate 124 (FIG. 3). The gasket 126 may be formed from any suitable material, such as neoprene, nitrile rubber, styrene-butadiene rubber, silicone rubber, butyl rubber, polyurethane, and the like. It should be appreciated that this is not an exhaustive list and other suitable materials may be used to form the gasket 126. Although the gasket 126 is illustrated in FIG. 5 in the particular shape in which the gasket 126 is fitted within the groove 150 formed in the plate 124 (FIG. 3), it should be appreciated that the gasket 126 is flexible and may be formed in any other suitable shape corresponding to a groove in which it is to be positioned.

With respect to the shape of the gasket 126 illustrated in FIG. 5, the gasket 126 includes an outer gasket portion 176. The gasket 126 further includes a first side gasket portion 178 extending from an end of the outer gasket portion 176, a first inner gasket portion 180 extending from an end of the first side gasket portion 178 opposite the outer gasket portion 176, and a first terminating gasket portion 182 extending from an end of the first inner gasket portion 180 opposite the first side gasket portion 178. As described in more detail herein, the first side gasket portion 178, the first inner gasket portion 180, and the first terminating gasket portion 182 are formed in a shape corresponding to the first entrapment profile 162 of the groove 150 (FIG. 3).

Similarly, the gasket 126 further includes a second side gasket portion 184 extending from an end of the outer gasket portion 176 opposite the first side gasket portion 178, a second inner gasket portion 186 extending from an end of the second side gasket portion 184 opposite the outer gasket portion 176, and a second terminating gasket portion 188 extending from an end of the second inner gasket portion 186 opposite the second side gasket portion 184. As described in more detail herein, the second side gasket portion 184, the second inner gasket portion 186, and the second terminating gasket portion 188 are formed in a shape corresponding to the second entrapment profile 172 of the groove 150 (FIG. 3).

In embodiments, as shown in FIG. 5, the gasket 126 has a consistent thickness throughout. Specifically, a thickness of the outer gasket portion 176, the first side gasket portion 178, the first inner gasket portion 180, the first terminating gasket portion 182, the second side gasket portion 184, the second inner gasket portion 186, and the second terminating gasket portion 188 remains the same throughout.

Figure 6:
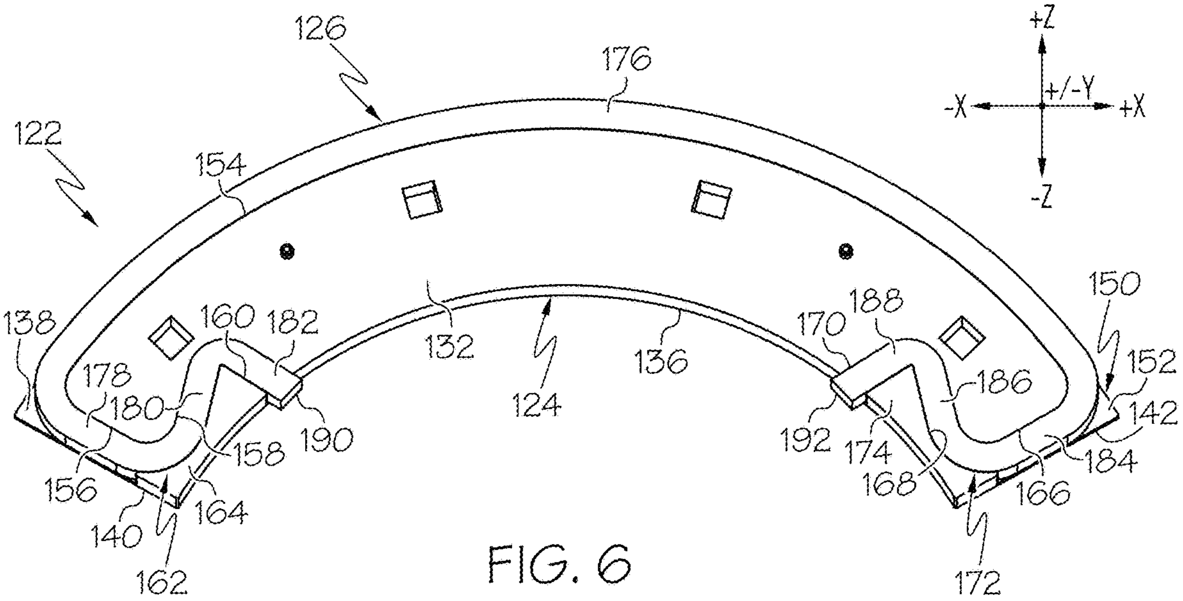
FIG. 6 schematically depicts a front perspective view of a segment of the sprocket damping assembly including the plate of FIG. 3 and the gasket of FIG. 5, according to one or more embodiments shown and described herein.

Referring now to FIG. 6, the gasket 126 is shown positioned within the groove 150 formed in the inner surface 132 of the plate 124 and against the recessed wall 152. Specifically, the outer gasket portion 176 is received within outer groove portion 154. Additionally, the first side gasket portion 178 is received within the first side groove portion 156, the first inner gasket portion 180 is received within the first inner groove portion 158, and the first terminating gasket portion 182 is received within the first terminating groove portion 160. As shown, the first side gasket portion 178 is flush with the first side edge 140 of the plate 124. Stated another way, the first side gasket portion 178 does not extend past the first side edge 140 of the plate 124. Similarly, the second side gasket portion 184 is received within the second side groove portion 166, the second inner gasket portion 186 is received within the second inner groove portion 168, and the second terminating gasket portion 188 is received within the second terminating groove portion 170. As shown, the second side gasket portion 184 is flush with the second side edge 142 of the plate 124. Stated another way, the second side gasket portion 184 does not extend past the second side edge 142 of the plate 124.

In embodiments, the first terminating gasket portion 182 and the second terminating gasket portion 188 may initially have a length greater than that illustrated in FIGS. 5 and 6 and subsequently cut to size once positioned within the groove 150. Particularly, a free end 190 of the first terminating gasket portion 182 and a free end 192 of the second terminating gasket portion 188 are cut to terminate close to the inner radial edge 136. As shown in FIG. 6, the free end 190 of the first terminating gasket portion 182 and the free end 192 of the second terminating gasket portion 188 are cut to extend past the inner radial edge 136. However, in other embodiments, the free end 190 of the first terminating gasket portion 182 and the free end 192 of the second terminating gasket portion 188 are cut to terminate prior to the inner radial edge 136.

In operation, when the plate 124 is positioned against the sprocket 104 (FIG. 2), the inner surface 132 of the plate 124 faces the sprocket 104 and the outer surface 134 of the plate 124 faces away from the sprocket 104. Accordingly, the gasket 126 is sandwiched between the groove 150 formed in the inner surface 132 of the plate 124 and either the inner surface 106 or the outer surface 108 of the sprocket 104 to which the plate 124 is mounted. It should be appreciated that by positioning the gasket 126 to extend through the first entrapment profile 162 and the second entrapment profile 172, the gasket 126 is further retained within the plate 124.

Figure 7:
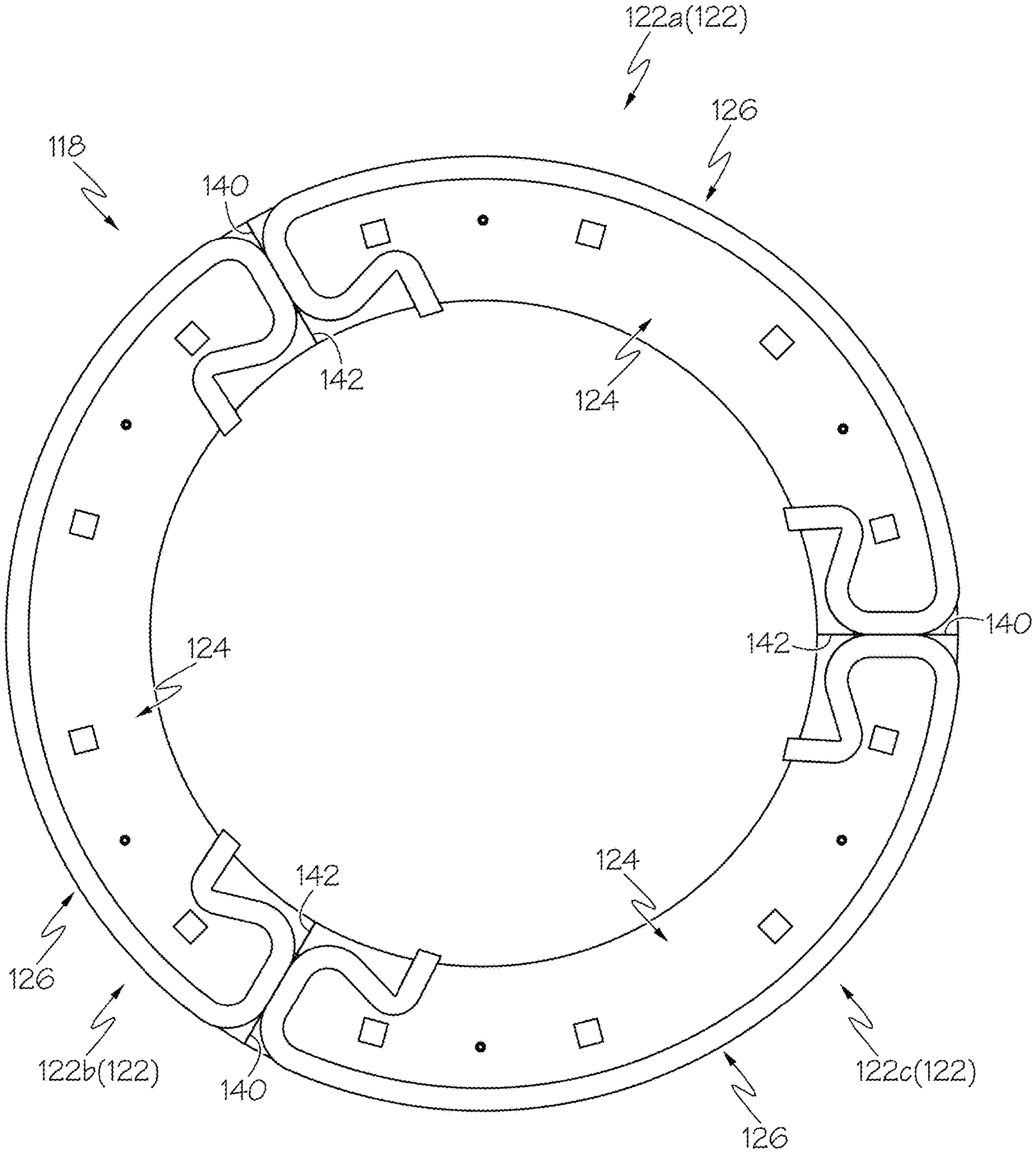
FIG. 7 schematically depicts a front view of the sprocket damping assembly including a plurality of the segments of FIG. 6, according to one or more embodiments shown and described herein.

Referring now to FIG. 7, a plurality of sprocket damping segments 122 are positioned adjacent one another in a circular orientation to form the sprocket damping assembly 118. Specifically, the sprocket damping segments 122 include a first sprocket damping segment 122*a*, a second sprocket damping segment 122*b*, and a third sprocket damping segment 122*c* each having identical structure. The sprocket damping segments 122*a*, 122*b*, 122*c* are positioned such that the first side edge 140 of the plate 124 of the first sprocket damping segment 122*a* is positioned adjacent the second side edge 142 of the plate 124 of the second sprocket damping segment 122*b*, the first side edge 140 of the plate 124 of the second sprocket damping segment 122*b* is positioned adjacent the first side edge 140 of the plate 124 of the third sprocket damping segment 122*c*, and the first side edge 140 of the plate 124 of the third sprocket damping segment 122*c* is positioned adjacent the second side edge 142 of the plate 124 of the first sprocket damping segment 122*a*.

As described herein, the sprocket damping segments 122*a*, 122*b*, 122*c* may be attached to one another and, subsequently, one or more of the sprocket damping segments 122*a*, 122*b*, 122*c* may be attached to the sprocket 104 (FIG. 1). Alternatively, the sprocket damping segments 122*a*, 122*b*, 122*c* may not be attached to one another and each individually attached to the sprocket 104.

From the above, it is to be appreciated that defined herein is a sprocket damping assembly for mounting to a surface of a sprocket to dampen noise caused by chains engaging teeth formed on a perimeter of the sprocket. The sprocket damping assembly includes a plurality of individual sprocket damping segments arranged in a circular pattern including a gasket that contacts the chains to dampen the noise.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A sprocket damping segment comprising:

a plate including an inner surface, an outer surface opposite the inner surface, an inner radial edge, an outer radial edge opposite the inner radial edge, a first side edge, and a second side edge opposite the first side edge, a groove formed in the inner surface and extending along the outer radial surface, the first side edge, and the second side edge; and a gasket positionable within the groove to extend along the outer radial edge, the first side edge, and the second side edge of the plate.

2. The sprocket damping segment of claim 1, wherein the groove defines an outer groove portion extending along the outer radial edge of the plate, a first side groove portion extending from an end of the outer groove portion and along the first side edge of the plate, and a second side groove portion extending from an opposite end of the outer groove portion and along the second side edge of the plate.

3. The sprocket damping segment of claim 2, wherein:

the groove defines a first inner groove portion extending from an end of the first side groove portion opposite the outer groove portion, and a first terminating groove portion extending from an end of the first inner groove portion opposite the first side groove portion, the first side groove portion, the first inner groove portion, and the first terminating groove portion defines a first entrapment profile; and a second inner groove portion extending from an end of the second side groove portion opposite the outer groove portion, a second terminating groove portion extending from an end of the second inner groove portion opposite the second side groove portion, the second side groove portion, the second inner groove portion, and the second terminating groove portion defines a second entrapment profile.

4. The sprocket damping segment of claim 3, wherein the first entrapment profile is a mirror image of the second entrapment profile.

5. The sprocket damping segment of claim 3, wherein a first angle between the first side groove portion and the first inner groove portion is equal to or greater than 50 degrees and less than or equal to 110 degrees.

6. The sprocket damping segment of claim 3, wherein a second angle between the first inner groove portion and the first terminating groove portion is equal to or greater than 40 degrees and less than or equal to 100 degrees.

7. The sprocket damping segment of claim 3, wherein a third angle between the first terminating groove portion and the inner radial edge is equal to or greater than 60 degrees and less than or equal to 120 degrees.

8. The sprocket damping segment of claim 1, wherein the plate has an arcuate shape.

9. The sprocket damping segment of claim 1, wherein one or more mounting holes are formed in the plate.

10. The sprocket damping segment of claim 9, wherein a plurality of mounting holes are formed in the plate and equidistantly spaced apart from one another between the first side edge and the second side edge.

11. A sprocket damping assembly comprising:

a plurality of sprocket damping segments arranged in a circular orientation, each sprocket damping segment comprising:

a plate including an inner surface, an outer surface opposite the inner surface, an inner radial edge, an outer radial edge opposite the inner radial edge, a first side edge, and a second side edge opposite the first side edge, a groove formed in the inner surface and extending along the outer radial surface, the first side edge, and the second side edge; and a gasket positionable within the groove to extend along the outer radial edge, the first side edge, and the second side edge of the plate.

12. The sprocket damping assembly of claim 11, wherein the plurality of sprocket damping segments are fixed to one another.

13. The sprocket damping assembly of claim 11, wherein each sprocket damping segment is identical to one another.

14. The sprocket damping assembly of claim 11, wherein the groove defines an outer groove portion extending along the outer radial edge of the plate, a first side groove portion extending from an end of the outer groove portion and along the first side edge of the plate, and a second side groove portion extending from an opposite end of the outer groove portion and along the second side edge of the plate.

15. The sprocket damping assembly of claim 14, wherein:

the groove defines a first inner groove portion extending from an end of the first side groove portion opposite the outer groove portion, and a first terminating groove portion extending from an end of the first inner groove portion opposite the first side groove portion, the first side groove portion, the first inner groove portion, and the first terminating groove portion defines a first entrapment profile; and a second inner groove portion extending from an end of the second side groove portion opposite the outer groove portion, a second terminating groove portion extending from an end of the second inner groove portion opposite the second side groove portion, the second side groove portion, the second inner groove portion, and the second terminating groove portion defines a second entrapment profile.

16. The sprocket damping assembly of claim 15, wherein the first entrapment profile is a mirror image of the second entrapment profile.

17. A conveyor system comprising:

a shaft;

a pair of sprockets provided at opposite ends of the shaft; and a pair of sprocket damping assemblies, each sprocket damping assembly provided on a respective sprocket, each sprocket assembly comprising a plurality of sprocket damping segments, each sprocket damping segment comprising:

a plate including an outer radial edge, a first side edge, and a second side edge opposite the first side edge, a groove formed in the plate and extending along the outer radial surface, the first side edge, and the second side edge; and a gasket positionable within the groove to extend along the outer radial edge, the first side edge, and the second side edge of the plate.

18. The conveyor system of claim 17, wherein:

each sprocket includes an inner surface facing the shaft and an outer surface opposite the inner surface; and each sprocket damping assembly provided on the inner surface of a respective sprocket.

19. The conveyor system of claim 17, wherein:

each sprocket includes a perimeter and a plurality of teeth extending in an outer radial direction;

a pair of chains including link plates, each chain engaging the plurality of teeth of a respective sprocket; and the gasket of each sprocket damping assembly contacting the link plates of a respective chain of the pair of chains as the sprockets rotate.

20. The conveyor system of claim 17, wherein the groove defines an outer groove portion extending along an outer radial edge of the plate, a first side groove portion extending from an end of the outer groove portion and along the first side edge of the plate, and a second side groove portion extending from an opposite end of the outer groove portion and along the second side edge of the plate.

* * * * *